Feb. 24, 1959  E. F. LOSCO ET AL  2,874,453
APPLYING METAL COATINGS TO MOLYBDENUM
Filed Nov. 2, 1956

WITNESSES:
Charles V. Board
Bernard R. Gieguey

INVENTORS
Ezekiel F. Losco, James H. Bechtold,
and John P. Webb.
BY
Frederick Shapoe
ATTORNEY

United States Patent Office 2,874,453
Patented Feb. 24, 1959

2,874,453

APPLYING METAL COATINGS TO MOLYBDENUM

Ezekiel F. Losco, Whitehall, James H. Bechtold, Pittsburgh, and John P. Webb, Monroeville, Pa., assignors to Westinghouse Electric Corporation, East Pittsburgh, Pa., a corporation of Pennsylvania Application November 2, 1956, Serial No. 620,069

6 Claims. (Cl. 29—183.5)

This invention relates to the application to molydenum of metal coatings that can be thoroughly and uniformly wetted by solder materials, the metal coatings being characterized further by having a thermal coefficient of expansion of substantially the same value as that of molybdenum.

Heretofore, it has been extremely difficult to solder or braze molybdenum to molybdenum or to other metals. It has been proposed to apply a coating of nickel to molybdenum prior to soldering. Nickel coated molybdenum has proven satisfactory for the application of low melting point solders; however, it has not been satisfactory for the application of high melting point solders or brazing alloys such as those having a melting point of from between 620° C. to 1000° C. High melting point brazing alloys do not bond well to nickel coated molybdenum and can be easily stripped therefrom. The failure to obtain a good bond has been attributed to the differences in thermal expansion of nickel and molybdenum which gives rise to a bimetal effect when brazing alloys are applied thereto.

It is the object of the present invention to provide for applying to a body of molybdenum metal a coating of a metal that is thoroughly and uniformly wetted by high melting point brazing materials and that has a thermal coefficient of expansion of substantially the same value as that of molybdenum, said metal coating being made by first preparing an assembly comprising a body of molybdenum metal and a casing of a selected metal possessing the above-mentioned properties enclosing the molybdenum body, and then subjecting the assembly to heat and pressure to reduce the cross-sectional area of the assembly and to firmly bond together the molybdenum and the casing metal.

Figure 1:
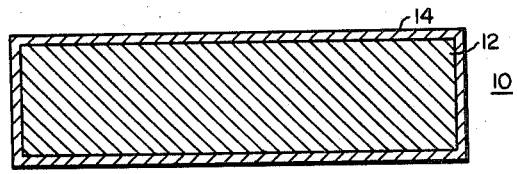
Figure 2:
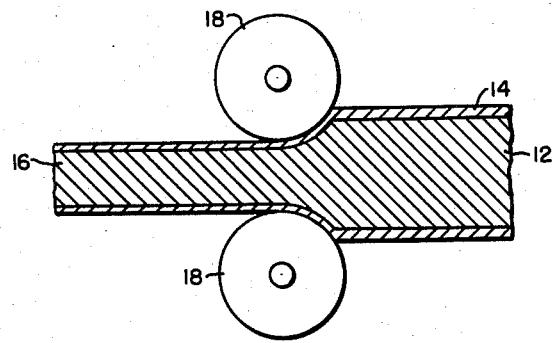

Other objects of the invention will, in part, be obvious and will, in part, appear hereinafter. For a better understanding of the nature and objects of the invention, reference should be had to the following detailed description and drawing, in which:

Figure 1 is a cross section through an assembly of a molybdenum body having applied to its outer surface a casing of a metal having a thermal coefficient of expansion of substantially the same value as that of molybdenum metal; and Fig. 2 is a view in elevation, partly in section, illustrating the rolling and reduction of the assembly of Fig. 1 to form the final coated molybdenum product.

In accordance with this invention, a method has been discovered for producing on bodies of molybdenum metal well bonded coatings of metals that have a thermal coefficient of expansion of substantially the same value as that of molybdenum. The coating metal is selected so as to provide the molybdenum body with a surface that is readily, thoroughly, and uniformly wetted by high melting point brazing materials.

Briefly, the method of this invention comprises preparing an assembly by completely encasing a clean, oxide-free molybdenum body in a casing of metal having a thermal coefficient of expansion of substantially the same value as that of molybdenum and which is readily, easily and uniformly wetted by solder materials without employing a flux. The assembly is then heated to a temperature of from 870° C. to 1320° C. and rolled under pressure to reduce the cross-sectional area of the assembly at least 30%, whereby to effect a good bond between the molybdenum body and the casing.

The invention will be detailed hereinafter specifically by reference to molybdenum metal but it will be understood that similar procedures may be applied to alloys of molybdenum that possess nearly the same coefficient of thermal expansion as molybdenum metal. Molybdenum has a thermal coefficient of expansion of about $4.9 \times 10^{-6}$ inch per inch per degree centigrade. The molybdenum can be alloyed with minor amounts of other metals such as tungsten, niobium, and titanium without greatly changing its thermal coefficient of expansion. Thus, an alloy composed of 5% tungsten and 95% molybdenum has nearly the same thermal coefficient as molybdenum metal. Alloys of molybdenum having a coefficient of thermal expansion of from between $3.8 \times 10^{-6}$ and $5.0 \times 10^{-6}$ inch per inch per degree centigrade can satisfactorily be employed in carrying out this invention.

The casing metal employed in carrying out this invention is an alloy that has a thermal coefficient of expansion of substantially the same value as that of molybdenum. An alloy having a melting point above 1200° C., preferably above 1400° C., and having a thermal coefficient of expansion of between about $3.8 \times 10^{-6}$ and $5.0 \times 10^{-6}$ inch per inch per degree centigrade is satisfactory. An additional requirement of the casing metal is that it be a metal that is readily, thoroughly and uniformly wetted by high melting point brazing materials and preferably one that does not require a flux. Particularly suitable casing metals are alloys composed of from 10% to 35% by weight of cobalt, 33% to 22% by weight of nickel and the balance being iron, and with up to 10% chromium being present in some cases. Manganese and incidental impurities may be present in small amounts. Examples of suitable alloy compositions are: (1) an alloy comprising, by weight, 29% nickel, 17% cobalt, and the balance being substantially all iron; (2) an alloy comprising 28% nickel, 18% cobalt and the balance being substantially all iron; and (3) an alloy comprising 37% iron, 30% nickel, 25% cobalt, and 8% chromium. It will be apparent to those skilled in the art that other alloys possessing the above recited requirements will be suitable casing metals for the purpose of this invention.

The applied casing metal is of such thickness that when the assembly has been reduced to the desired cross-sectional area and the bond effected, the exterior coating will usually be of the order of from 1 mil to 10 mils. Usually the thickness of the casing wall before reduction, will be from 5% to 20% the thickness of the molybdenum body.

Referring to Fig. 1 of the drawing, there is illustrated a cross section of an assembly 10 for use in practicing this invention. The assembly 10 comprises a molybdenum body 12, and a casing 14 of the coating metal completely enclosing the molybdenum body.

The assembly may be produced in any convenient manner. It is important, in preparing the assembly that the surface of the molybdenum body and the interior surface of the casing metal be kept clean and free of oxides. Any foreign particle or oxide present will impair the attainment of good bond between the molybdenum body and the casing metal. It is essential that the molybdenum body be completely enclosed and sealed in the casing metal in order to prevent oxidation of the molybdenum during the heating and rolling procedure.

One method that may be employed to form the assembly in practicing this invention is to first prepare a container having an opening at one end thereof, by welding together sheets of desired thickness and shape of the casing metal. The container is so constructed that it permits a molybdenum body of desired size to be inserted through the open end and to substantially completely fill the container. The container is then completed by welding a sheet of the casing metal at the open end of the container to completely enclose and seal in the molybdenum body. If desired the container may be evacuated after applying the end through a sealable tube or other means.

The prepared assembly is heated to a temperature of from 870° C. to 1320° C. and then hot worked, preferably by rolling, to effect a reduction in the cross-sectional area and to produce a good bond between the components of the assembly, as illustrated in Fig. 2 of the drawing. This produces a long continuous multi-layer strip 16 shown emerging at the left of rolls 18.

The following example sets forth a rolling schedule that may be employed in carrying out this invention. Prior to the first pass the assembly is heated to a temperature of 1024° C. for 15 minutes and the assembly is reheated between each pass. A reduction in area of approximately 25% is obtained in each pass. After the final pass the assembly is heated at 1024° C. for a period of about 5 minutes.

*Example I*

| Pass | Pass temperature °C. |
| --- | --- |
| 1 | 1024 |
| 2 | 1024 |
| 3 | 1024 |
| 4 | 1024 |
| 5 | 1024 |
| 6 | 1024 |
| 7 | 1024 |

The schedule set forth in Example I produces a wrought member having a substantially uniform cold worked structure and an excellent cold ductility. A good bond between the components of the assembly is usually effected during the first or second pass, i. e., when 30% reduction is reached.

It will be obvious to those skilled in the art that many variations can be made in the rolling schedule of Example I depending on the original size of the assembly, the amount of reduction in cross-sectional area desired, and the desired room temperature ductility of the molybdenum. Other rolling schedules suitable for carrying out this invention are set forth in U. S. Patent No. 2,666,721 and assigned to the same assignee as the present invention. In employing the rolling schedules as set forth in U. S. Patent 2,666,721 it is important that the rolling temperature not exceed the solidus temperaure of the casing metal and it is preferred to maintain the rolling temperature below 1150° C. at all times.

In general, the wrought members produced in accordance with the foregoing will comprise a core of molybdenum base alloy and an exterior casing having a wall thickness of from 1 mil to 10 mils of a metal that is easily wetted by high melting point brazing materials and also has a thermal coefficient of expansion of substantially the same value as that of the molybdenum or its base alloy. The wrought members are soft and ductile and are easily cut and formed by conventional methods into desired shapes. The bond between the molybdenum and the casing metal will remain strong and continuous to enable satisfactory forming.

Additional improvements may be made in the wrought member of this invention by the application of a relatively thin intermediate coating of a bonding metal.

Thus, in preparing the assembly prior to heating and rolling, a thin intermediate coating of a bonding metal is applied between the molybdenum body and the casing metal. The thin intermediate coating comprises a bonding metal selected from the group consisting of chromium, palladium, copper and an alloy comprising, by weight, from 60% to 70% nicked and the balance being substantially all copper. The application of the intermediate coating can be made either to the surface of the molybdenum body or to that one side of the casing that is placed in contact with the molybdenum body. The application of the bonding metal can be made by dipping, spraying or electroplating or simply by sandwiching thin sheets of the intermediate bonding metal between the molybdenum body and the casing metal. It is not essential that the entire surface of the molybdenum body or that all surfaces of the casing metal that come into contact with the molybdenum body be thus completely coated initially. It is essential, however, that after preparation of the assembly, an intermediate layer of the bonding metal is so disposed between the molybdenum body and the casing metal that the intermediate layer is subjected to the direct pressure of the rollers during the rolling procedure. The thickness of the intermediate layer or coating employed is of the order of from 1 mil to 10 mils.

The assembly thus prepared is a three component assembly comprising a body of molybdenum, an intermediate layer of a bonding metal and a casing of a metal that is thoroughly and uniformly wetted by brazing and solder metals and that has a coefficient of thermal expansion of substantially the same value as that of molybdenum. The assembly is reduced in cross-sectional area by the rolling procedure as hereinbefore set forth. The resulting wrought member is characterized by an extremely strong bond between the molybdenum body and the casing metal.

For certain applications it may be desirable to employ a wrought member wherein the casing metal is disposed on only one surface of the molybdenum metal. This is accomplished by preparing a container open at one end thereof of the casing metal, as previously set forth. A sandwiched member comprising two molybdenum bodies separated by a thin film of an inert material such as aluminum oxide or magnesium oxide, of the order of 1 mil in thickness, is then inserted into the prepared container through the open end thereof and the open end of the container sealed as previously set forth. The completed assembly is then heated and rolled so as to effect a reduction in the cross-sectional area of the assembly. After rolling, the edges are cut from the rolled member and the two elongated molybdenum bodies are easily separated along the junction of the thin film of the applied inert material to provide two elongated wrought molybdenum members having a surface of the applied casing metal. The sandwiched assembly may comprise two molybdenum bodies of equal or unequal thicknesses, and the thin film of inert material is so disposed between the two molybdenum bodies that it is subjected to the direct pressure of the rollers during the rolling procedure.

The wrought assembly of this invention has proven highly successful as base support and contact members for silicon semiconductor rectifiers of the P–N junction type. One of the critical problems encountered in preparing satisfactory rectifiers from silicon semiconductor materials is to dissipate rapidly and efficiently the heat developed during use. Excessive temperatures, above about 220° C., may impair operation of the rectifier devices and even cause failure of the rectifier if it is subjected to heavy electrical loads while at such elevated temperatures. The silicon wafer must be mounted on and be in intimate thermal and electrical association with an end contact of a highly heat conducting metal that has nearly the same thermal coefficient of expansion as silicon. The metal molybdenum meets both these requirements; however, it has proven extremely difficult to join the silicon wafer directly to molybdenum by soldering or brazing techniques. By employing the coated molybdenum body of this invention as the end contact and a high melting point brazing material such for example as an alloy comprising 95% silver and 5% antimony, or 98% silver and 2% germanium, it has been possible to adequately bond the silicon wafer to the end contact. The joint formed between the silicon wafer and the end contact is mechanically strong and has good thermal and electrical conductivity. To illustrate the good mechanical strength of the bond an assembly comprising a silicon wafer joined by a brazed silver alloy bond to an end contact of the clad molybdenum was bent through an angle of about 90°. The silicon wafer fractured due to its brittleness but the silver braze firmly adhered to the clad molybdenum end contact.

Since certain obvious changes may be made in the above procedures and different embodiments of the invention may be made without departing from the scope thereof, it is intended that all matter contained in the above description and drawing shall be interpreted as illustrative and not in a limiting sense.

We claim as our invention:

1. In the process of applying to a body of molybdenum metal a well bonded coating of a metal that is thoroughly and uniformly wetted by solder and brazing metals and that has a thermal coefficient of expansion of substantially the same value as that of molybdenum, the steps comprising (1) preparing an assembly comprising a molybdenum body completely enclosed and sealed in a casing of at least one alloy composed of from 10% to 35% by weight of cobalt, from 33% to 22% by weight of nickel, from 0 to 10% by weight of chromium and the balance being iron, except for incidental additions, (2) heating the assembly to a temperature of from 870° C. to 1320° C., and (3) rolling the heated assembly to effect a reduction of at least 30% in cross-sectional area and to effect intimate bonding of the molybdenum body and the casing.

2. In the process of applying to a body of molybdenum metal a well bonded coating of a metal that is thoroughly and uniformly wetted by solder and brazing metals and that has a thermal coefficient of expansion of substantially the same value as that of molybdenum, the steps comprising (1) preparing an assembly comprising a molybdenum body completely enclosed and sealed in a casing of at least one alloy composed of from 10% to 35% by weight of cobalt, from 33% to 22% by weight of nickel, from 0 to 10% by weight of chromium, and the balance being iron, except for incidental additions, said casing having a wall thickness of from 5% to 20% the thickness of the molybdenum body, (2) heating the assembly to a temperature of from 870° C. to 1320° C., and (3) repeatedly rolling the heated assembly to effect a reduction in its cross-sectional area and to produce an intimate bond between the molybdenum body and the casing, with intermediate reheating, until the assembly has been reduced at least 30% in cross-sectional area.

3. A unitary wrought member comprising a body of a molybdenum base alloy and a layer on at least one surface of said body of from about 1 mil to 10 mils in thickness of a metal that is thoroughly and uniformly wetted by solder and brazing metals and that has a thermal coefficient of expansion of from between $3.8 \times 10^{-6}$ and $5.0 \times 10^{-6}$ inch per inch per degree centigrade, said layer being composed of from 10% to 35% by weight of cobalt, from 33% to 22% by weight of nickel, from 0% to 10% by weight of chromium, and the balance being iron except for incidental additions, the body and layer being united into a unitary member by hot rolling which effects a reduction of at least 30% in cross-sectional area.

4. In the process of applying to a body of molybdenum metal a surface of a metal that is thoroughly and uniformly wetted by solder and brazing metals and that has a thermal coefficient of expansion of substantially the same value as that of molybdenum, the steps comprising (1) preparing an assembly comprising two superimposed bodies of molybdenum metal separated from one another by a thin film of an inert parting material, said assembly being completely enclosed and sealed in a casing of at least one alloy composed of from 10% to 35% by weight of cobalt, from 33% to 22% by weight of nickel, from 0 to 10% by weight of chromium, and the balance being iron except for incidental additions, said casing having a wall thickness of from 5% to 20% of the combined thickness of the two molybdenum bodies, (2) heating the assembly to a temperature of from 870° C. to 1320° C., (3) repeatedly rolling the heated assembly to effect a reduction in its cross-sectional area and to produce an intimate bond between the molybdenum bodies and the casing metal, with intermediate reheating, until the assembly has been reduced at least 30% in cross-sectional area, (4) removing the edges from the rolled assembly, and (5) separating the two molybdenum bodies from one another.

5. In the process of applying to a body of molybdenum metal a well bonded coating of a metal that is thoroughly and uniformly wetted by solder and brazing metals and that has a thermal coefficient of expansion of substantially the same value as that of molybdenum, the steps comprising (1) preparing an assembly by completely enclosing and sealing a molybdenum body in a casing of at least one alloy composed of from 10% to 35% by weight of cobalt, from 33% to 22% by weight of nickel, from 0 to 10% by weight of chromium, and the balance being iron except for incidental additions and an intermediate bonding layer of a metal selected from the group consisting of palladium, copper, chromium and an alloy comprising, by weight, from 60% to 70% nickel and the balance being substantially all copper, said intermediate layer being of a thickness of the order of from 1 mil to 10 mils, and said casing being of a thickness of from 5% to 20% the thickness of the molybdenum body, (2) heating the assembly to a temperature of from 870° C. to 1320° C., and (3) repeatedly rolling the heated assembly to effect a reduction in cross-sectional area and to produce an intimate bond between the molybdenum body and the intermediate layer and the casing, with intermediate reheating, until the assembly has been reduced at least 30% in cross-sectional area.

6. A unitary wrought member comprising a body of a molybdenum base alloy, and exterior layer on at least one surface of said body of from about 1 mil to 10 mils in thickness of a metal that is thoroughly and uniformly wetted by solder and brazing metals and that has a thermal coefficient of expansion of from between $3.8 \times 10^{-6}$ and $5.0 \times 10^{-6}$ inch per inch per degree centigrade, said exterior layer being composed of, by weight, from 10% to 35% of cobalt, from 33% to 22% of nickel, from 0% to 10% of chromium, and the balance being iron except for incidental additions, and a substantially thinner intermediate bonding layer uniting the casing to the molybdenum body of a metal selected from the group consisting of palladium, copper, chromium and an alloy comprising, by weight, from 60% to 70% nickel and the balance being substantially all copper, the body, exterior layer and bonding layer being united into a unitary member by hot rolling which effects a reduction of at least 30% in cross-sectional area.

References Cited in the file of this patent

UNITED STATES PATENTS

| | | |
|---|---|---|
| 1,392,416 | Henderson | Oct. 4, 1921 |
| 2,247,755 | Hensel | July 1, 1941 |
| 2,665,475 | Campbell | Jan. 12, 1954 |
| 2,744,314 | Kinney | May 8, 1956 |